(12) United States Patent
Hu

(10) Patent No.: US 10,499,039 B2
(45) Date of Patent: Dec. 3, 2019

(54) PATH DETECTION SYSTEM AND PATH DETECTION METHOD GENERATING LASER PATTERN BY DIFFRACTIVE OPTICAL ELEMENT

(71) Applicant: Egismos Technology Corporation, Taipei (TW)

(72) Inventor: Di-Sheng Hu, Taipei (TW)

(73) Assignee: EGISMOS TECHNOLOGY CORPORATION, Taipei (TW)

(*) Notice: Subject to any disclaimer, the term of this patent is extended or adjusted under 35 U.S.C. 154(b) by 54 days.

(21) Appl. No.: 15/379,893

(22) Filed: Dec. 15, 2016

(65) Prior Publication Data

US 2018/0174322 A1 Jun. 21, 2018

(51) Int. Cl.

| G06T 7/73 | (2017.01) |
|---|---|
| G06T 7/521 | (2017.01) |
| G06T 7/246 | (2017.01) |
| H04N 13/02 | (2006.01) |
| G05D 1/02 | (2006.01) |
| H04N 13/254 | (2018.01) |
| H04N 13/221 | (2018.01) |

(52) U.S. Cl.
CPC .......... *H04N 13/254* (2018.05); *G05D 1/024* (2013.01); *G06T 7/521* (2017.01); *H04N 13/221* (2018.05)

(58) Field of Classification Search
CPC ...................................................... G06T 7/521
See application file for complete search history.

(56) References Cited

U.S. PATENT DOCUMENTS

| 6,614,422 | B1 | 9/2003 | Rafii et al. |
|---|---|---|---|
| 7,348,963 | B2 | 3/2008 | Bell |
| 7,433,024 | B2 | 10/2008 | Garcia et al. |
| 2008/0106746 | A1 | 5/2008 | Shpunt et al. |
| 2008/0240502 | A1 | 10/2008 | Freedman et al. |
| 2009/0034649 | A1 | 2/2009 | Litsyn et al. |
| 2009/0096783 | A1 | 4/2009 | Shpunt et al. |
| 2009/0183125 | A1 | 7/2009 | Magal et al. |
| 2009/0185274 | A1 | 7/2009 | Shpunt |
| 2010/0020078 | A1 | 1/2010 | Shpunt |
| 2012/0162077 | A1 | 6/2012 | Sze et al. |
| 2014/0055364 | A1 | 2/2014 | Sze et al. |
| 2016/0104044 | A1* | 4/2016 | Noh .................. G06K 9/00664 |
| 2016/0274679 | A1* | 9/2016 | Romano ............... G06F 3/0317 |

* cited by examiner

*Primary Examiner* — Mainul Hasan
(74) *Attorney, Agent, or Firm* — Muncy, Geissler, Olds & Lowe, P.C.

(57) ABSTRACT

A path detection system and a path detection method generating laser patterns by a diffractive optical element (DOE) are revealed. The path detection system is arranged at a mobile device while in use. A laser source projects structured light toward a forward path of the mobile device through the DOE. The structure light includes a transverse baseline and at least one transverse computational line. Then a lens is used to capture images of the structured light. When there is obstacle in a forward path of the mobile device, an image processing unit makes comparisons and performs computation according to changes in position and distance of the image of the respective transverse computational line relative to the X axis and the Y axis of the transverse baseline. Thus the relative position and distance of the obstacle in the forward path is checked in a real time manner.

2 Claims, 4 Drawing Sheets

PATH DETECTION SYSTEM AND PATH DETECTION METHOD GENERATING LASER PATTERN BY DIFFRACTIVE OPTICAL ELEMENT

BACKGROUND OF THE INVENTION

The present invention relates to a system and a method for detecting obstacles in a forward path, especially to a path detection system and a path detection method generating laser patterns by a diffractive optical element (DOE), in which structured light of the laser pattern projected by a laser light source through the DOE is used for detection. The structured light includes a transverse baseline and at least one transverse computational line.

The system and the method for detecting obstacles in a forward path according to the present invention are applied to a mobile device while in use. The mobile device is defined as, but not limited to, a robot able to move or a machine that moves automatically. For example, take a common room/clean robot as an example. When the room/clean robot without a system for obstacle detection in a forward path is used indoors, the room/clean robot is moved right forward when there is no obstacle in the forward path. The room/clean robot changes the direction of the motion randomly when it bumps into an obstacle. As to some other room/clean robots with ultrasonic detection system, they have shortcomings of inaccurate detection signals and lack of precision, false results, etc. Thus the conventional room/clean robot is unable to detect and avoid the obstacles in the forward path efficiently. The room/clean robot is also unable to have path planning ability. Thus the working efficiency of the conventional room/clean robot is lowered.

Moreover, although the use of the structured light in detection and location of obstacles has been revealed in some papers, these prior arts get problems of sophisticated system structure, difficulty in miniaturization, etc. in applications. Thus the efficiency of the device is low and this has negative effect on introduction of the device into various mobile devices.

Furthermore, there are already many prior arts available now in the field of a virtual input device (virtual keyboard) formed by projection techniques such as U.S. Pat. No. 6,614,422, US2012/0162077, US2014/0055364, etc. A system and a method using a virtual input device such as virtual keyboard or virtual mouse to input data are revealed. Although the above prior art already discloses how to detect and locate an operating element (such as user's finger) on a button of a virtual keyboard. Yet such technique is different from the detection system and method of the present invention able to be installed on a mobile device while in use. The technique is unable to be directly applied to various kinds of mobile devices.

In addition, refer to U.S. Pat. Nos. 7,348,963, 7,433,024, US2008/0240502, US 2008/0106746, US 2009/0185274, US 2009/0096783, US 2009/0034649, US 2009/0185274, US 2009/0183125, and US 2010/0020078, a remote-control user interface uses a featured object (control member) such as gesture or a part of human body that changes in relative positions and actions in a three-dimensional space (X, Y, Z coordinates) for remote control of various functions of a display. But the technique mentioned above is still different from the detection system and method of the present invention. Thus the system of the remote-control user interface is unable to be directly applied to various kinds of mobile devices.

SUMMARY OF THE INVENTION

Therefore it is a primary object of the present invention to provide a path detection system and a path detection method that generate laser patterns by a diffractive optical element (DOE) and are applied to a mobile device. The path detection system is set on a mobile device while in use and used for detecting and checking relative position and distance of 3D obstacles in a forward path of the mobile device in a real time manner. Thus collisions between the mobile device and the respective obstacle can be avoided.

In order to achieve the above object, a path detection system that generates laser patterns by a diffractive optical element (DOE) according to the present invention includes a laser light source, a diffractive optical element (DOE), at least one lens and an image processing unit. The path detection system is arranged at the mobile device while in use. The laser light source projects structure light that passes through the DOE and moves toward a forward path or area of the mobile device. The lens is used to capture images of the structured light. The image processing unit makes comparisons and performs computation according to image data of the structured light captured by the lens. The structured light includes a transverse baseline and at least one transverse computational line. The respective transverse computational line projected to the respective 3D object is changed along with the distance and external shape of the respective 3D obstacle when there is at least one 3D obstacle in a forward path of the mobile device. Thus the image of the respective transverse computational line captured by the lens is also changed. Now the image processing unit makes comparisons and performs computation according to changes in positions and distances of the images of the respective transverse computational line relative to the X axis and the Y axis of the transverse baseline. Thereby relative position and distance of the respective 3D obstacle in the forward path of the mobile device is detected and checked in a real time manner so as to avoid collisions of the mobile device with the respective obstacle.

A laser light beam emitted from the laser light source includes visible laser light and invisible laser light. The invisible light includes infrared (IR) laser light.

The lens included in the detection system is disposed above or under the laser light source and there is an angle between the lens and the laser light source.

The transverse baseline and the at least one transverse computational line include straight lines parallel to each other or curved lines parallel to each other.

The mobile device includes a robot able to move or a machine that moves automatically such as room/clean robot.

DETAILED DESCRIPTION OF THE PREFERRED EMBODIMENTS

Figure 1:
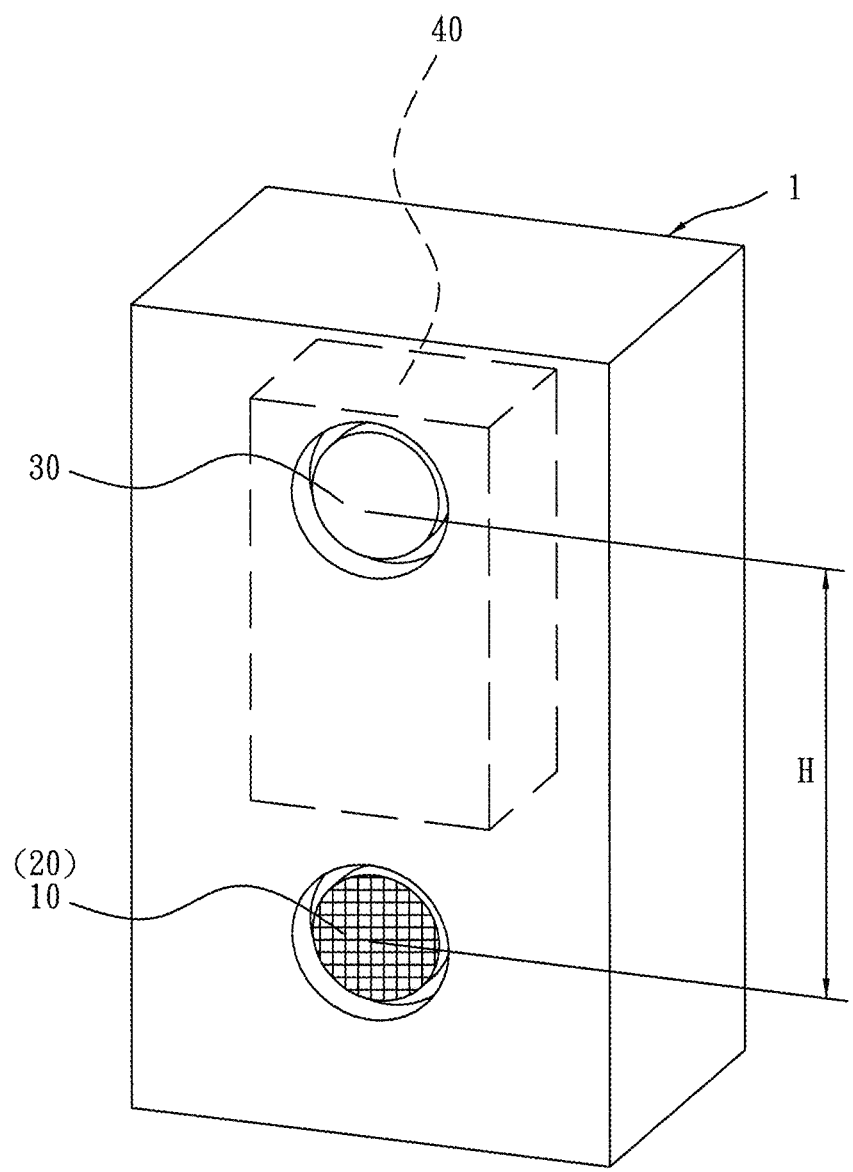
FIG. 1 is a perspective view of a module formed by an embodiment of a path detection system according to the present invention.
Figure 2:
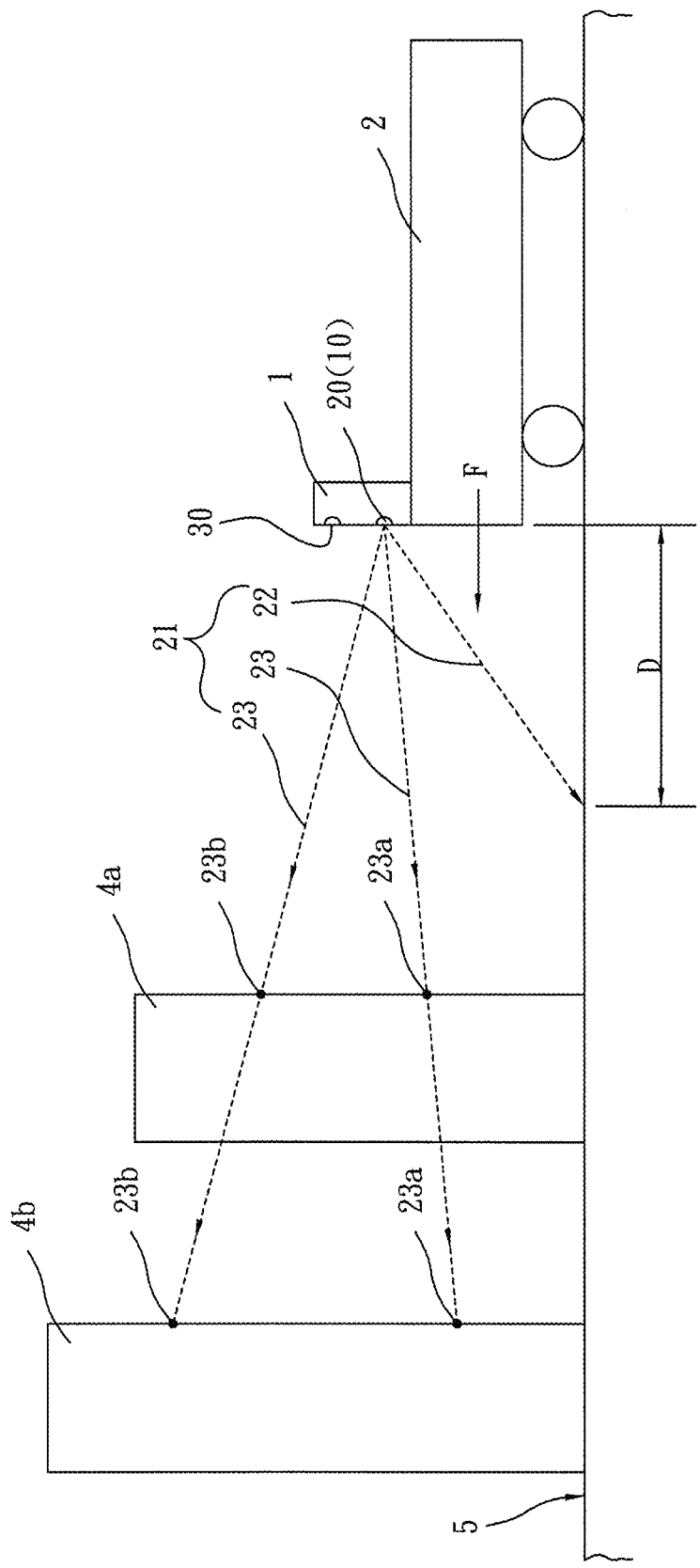
FIG. 2 is a schematic drawing showing a side view of an embodiment of a path detection system in use according to the present invention.

Refer to FIG. 1, a path detection system 1 that generates laser patterns by using a diffractive optical element (DOE)

is designed into a module. That means all the elements are mounted in a housing of a machine body. The path detection system 1 can be (but not limited) used in combination with a mobile device 2 and arranged at a solid object formed by the mobile device 2, as shown in FIG. 2. The path detection system 1 of the present invention mainly includes a laser light source 10, a diffractive optical element (DOE) 20, at least one lens 30, and an image processing unit 40 such as central processing unit (CPU) or microcontroller unit (MCU).

Figure 3:
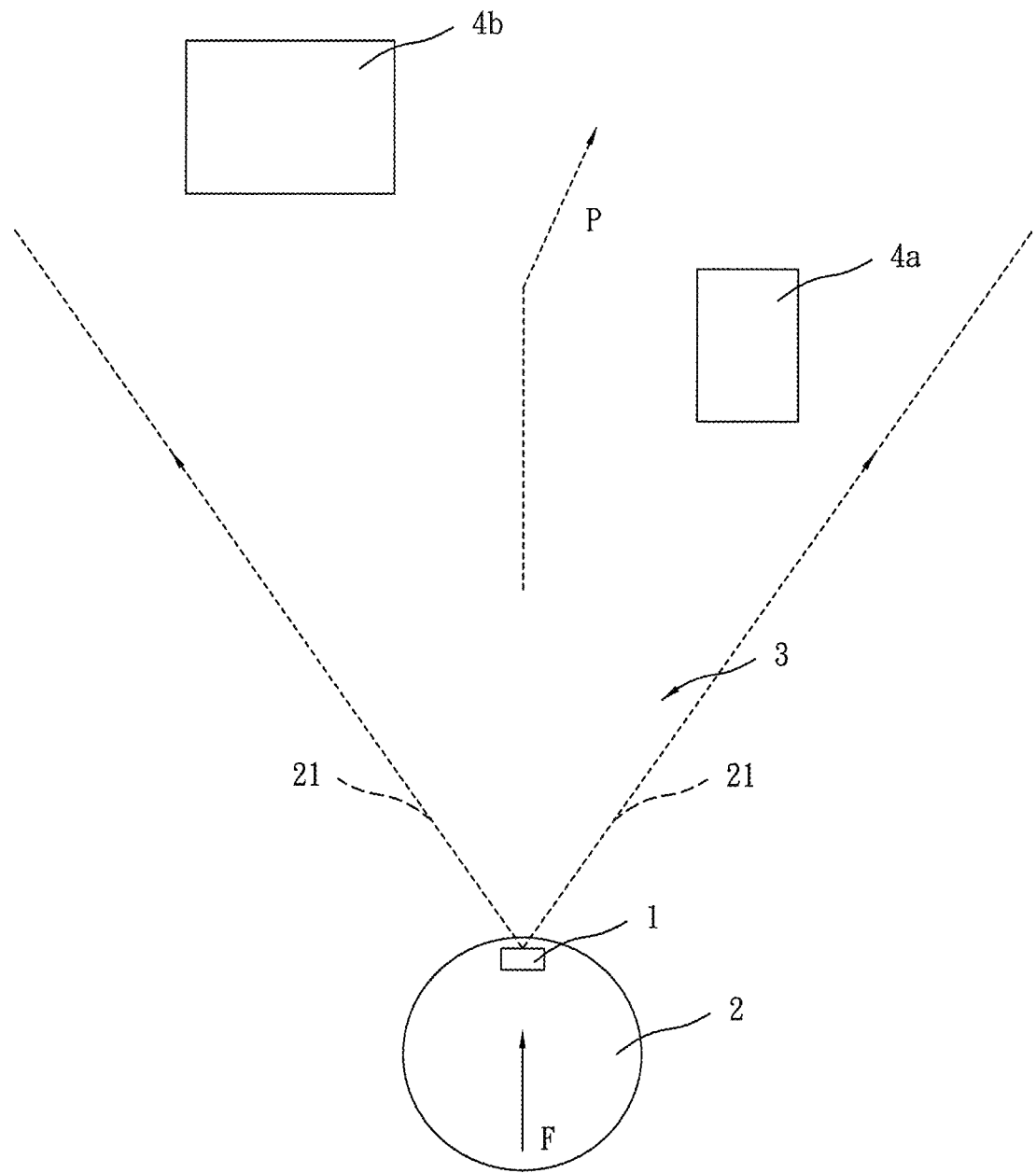
FIG. 3 is a schematic drawing showing a top view of the embodiment in FIG. 2.

The laser light source 10 is used to project a laser beam (21), as shown in FIG. 1, FIG. 2 and FIG. 3. The laser beam emitted from the laser source 1 includes visible laser light and invisible laser light. The optimal laser beam is, but not limited to, infrared (IR) laser light.

The DOE 20 is disposed in front of the laser light source 10, as shown in FIG. 1. Thus the laser light source 10 projects structured light 21 toward a forward path (or area) 3 of the mobile device 2 through the DOE 20, as shown in FIG. 2 and FIG. 3.

The number of the lens 30 is not limited. There is one lens 30 shown in FIG. 1. The lens 30 is used to capture images of the structured light 21 projected to the forward path (area) 3 of the mobile device 2 at a fixed angle. The fixed angle is the angle between a normal of the lens 30 and a normal of the laser light source 10. A height difference H between the lens 30 and the laser light source 10 is predetermined. The lens 30 can be disposed above or under the laser light source 10. In this embodiment, the lens 30 is arranged above the laser light source 10, as shown in FIG. 1 and FIG. 2.

The image processing unit 40 uses built-in software to make comparisons and perform computation according to data of the images of the structured light 21 captured by the lens 30.

Figure 4:
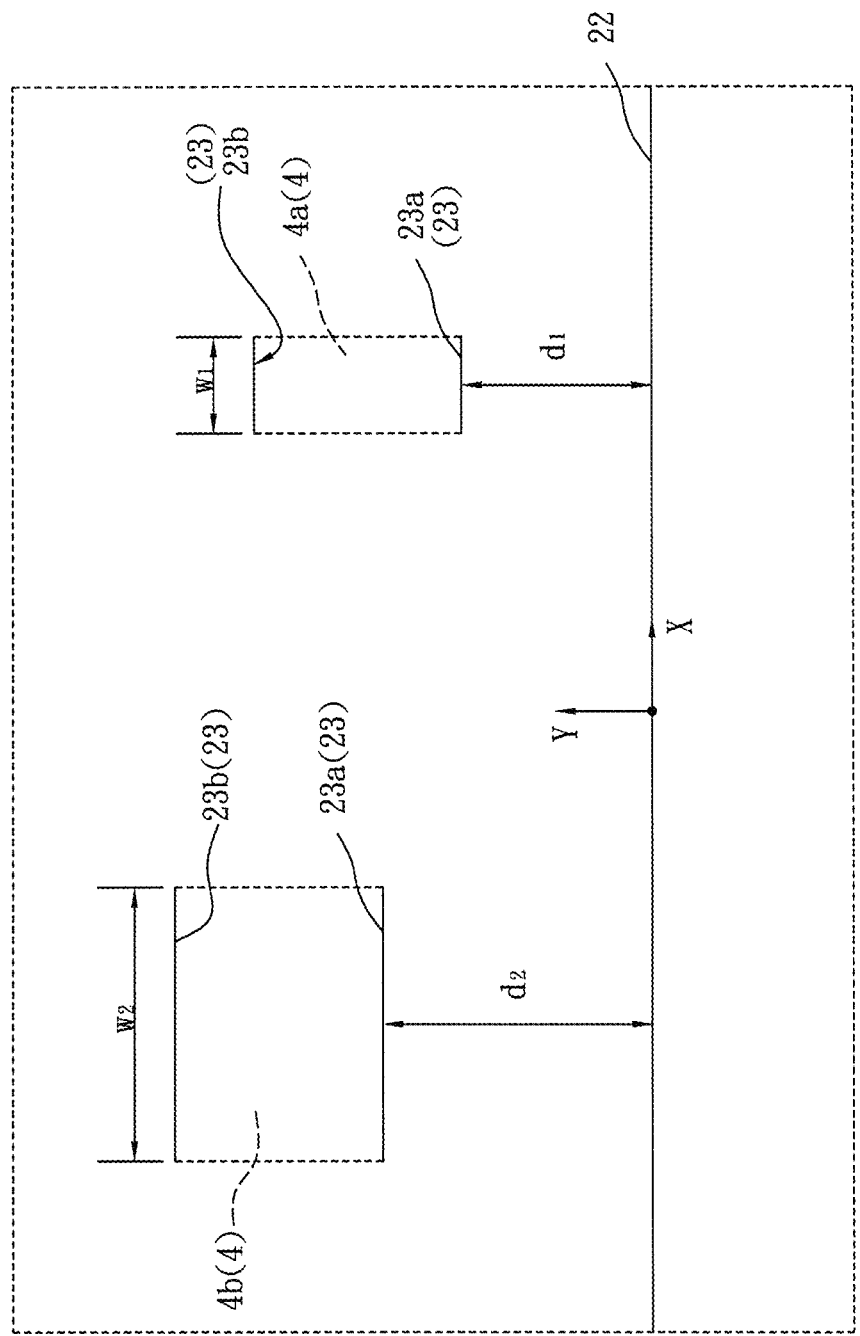
FIG. 4 is a schematic drawing showing images of structured light captured by a lens of an embodiment of a path detection system according to the present invention.

Refer to FIG. 2 and FIG. 4, a laser pattern of the structured light 21 generated by the DOE 20 includes a transverse baseline 22 and at least one transverse computational line 23. As shown in FIG. 2, there are two computational lines 23a, 23b in this embodiment. The transverse baseline 22 and the computational lines 23a, 23b are crossed with a direction of forward motion F of the mobile device 2. The transverse baseline 22 and each of the computational lines 23a, 23b have different angle of projection relative to the direction of forward motion F of the mobile device 2.

Refer to FIG. 2, in this embodiment, the projected position of the transverse baseline 22 is closest to the mobile device 2. The distance D between the position of the transverse baseline 22 relative to the mobile device 2 and the mobile device 2 is predetermined.

Refer to FIG. 2 and FIG. 3, the mobile device 2 is moved forward toward the direction of forward motion F on a plane 5. In FIG. 2 and FIG. 3, there is one closer and narrower obstacle 4a and one farther and wider obstacle 4b. Each transverse computational line 23a, 23b projected to the 3-dimensional (3D) obstacle 4a, 4b respectively is changed along with the distance and external shape of the 3D obstacle 4a, 4b when there is at least one 3D obstacle 4 in front of the mobile device 2, farther than the distance D and in the forward path (or area) 3. Thus the image of each transverse computational line 23 (23a, 23b) captured by the lens 30 is also changed. Refer to FIG. 4, the distance $d_1$ and the width $w_1$ of the transverse computational line 23a projected to the obstacle 4a relative to the Y axis and the X axis of the transverse baseline 22 are smaller than the distance $d_2$ and the width $w_2$ of the transverse computational line 23a projected to the obstacle 4b relative to the Y axis and the X axis of the transverse baseline 22. At the moment, the image processing unit 40 makes comparisons and performs computation according to changes in positions and distances of the images of the respective transverse computational line 23 (23a, 23b) relative to the X axis and the Y axis of the transverse baseline 22 (such as the distance $d_1$ and the width $w_1$), the predetermined distance D and the predetermined height difference H. The distance D is the distance between the position of the transverse baseline 22 relative to the mobile device 2 and the mobile device 2. The height difference H is the distance between the height of the lens 30 and the height of the laser light source 10. Thus the relative position and distance of the respective obstacle 4a, 4b in the forward path (or area) 3 of the mobile device 2 can be checked and obtained in a real time manner. Therefore collisions of the mobile device 2 with the obstacles 4a, 4b can be avoided while the mobile device 2 is moving forward. Moreover, an effective path that allows the mobile device 2 to move smoothly without collisions with each obstacle 4a, 4b can be found out by the software design of the image processing unit 40, as the dotted arrow P in FIG. 3 indicates. Thus indoor mapping is further provided for movement of the mobile device 2 with higher working efficiency.

As to the laser pattern of the structured light 21 generated through the DOE 20, it's optimal to include one transverse baseline 22 and at least two transverse computational lines 23. The more the transverse computational lines 23 included in the laser pattern, the easier the relative position, distance, height or shape of the respective obstacle 4a, 4b in the forward path (or area) 3 of the mobile device 2 can be checked and learned.

The image processing unit 40 can be a central processing unit (CPU) or a microcontroller unit (MCU), responsible for control of signal transmission and processing between the laser light source 10 and the lens 30. For example, the image processing unit 40 performs detection and calculates location of each obstacle 4a, 4b so as to achieve expected function of the path detection system 1 of the present invention.

Furthermore, as shown in FIG. 2 and FIG. 4, the transverse baseline 22 and the at least one transverse computational line 23 (23a, 23b) are preferred to be straight transverse lines parallel to each other. The transverse baseline 22 and the at least one transverse computational line 23 (23a, 23b) can also be curved transverse lines parallel to each other (not shown in figures).

A path detection method that generates laser patterns using a diffractive optical element (DOE) of the present invention includes the following steps.

Step 1: disposing a path detection system 1 on a mobile device 2 for detecting position of at least one obstacle 4 in a forward path (or area) 3 of the mobile device 2. The path detection system 1 includes a laser light source 10 for projecting a laser beam, a diffractive optical element (DOE) 20 disposed in front of the laser light source 10, at least one lens 30, and an image processing unit 40. The laser light source 10 projects structured light 21 on the forward path 3 of the mobile device 2 through the DOE 20. The lens 30 is used to capture images of the structured light 21 projected to the forward path (area) 3 of the mobile device 2 at a fixed angle. A height difference H between the lens 30 and the laser light source 10 is predetermined. The image processing unit 40 makes comparisons and performs computation according to image data of the structured light 21 captured by the lens 30.

Step 2: setting the structured light 21 to include a transverse baseline 22 and at least one transverse computational line 23. The transverse baseline 22 and the computational lines 23 are crossed with a direction of forward motion F of the mobile device 2. The transverse baseline 22 and each of the computational lines 23a, 23b have different angle of projection relative to the direction of forward motion F of the mobile device 2.

Step 3: setting a projected position of the transverse baseline 22 most closest to the mobile device 2 and predetermining a distance between the projected position of the transverse baseline 22 and the mobile device 2 as D.

Step 4: making comparisons and performing computation by the image processing unit 40 according to changes in position and distance of image of the transverse computational line 23 relative to the X axis and the Y axis of the transverse baseline 22 captured by the lens 30 to check and get relative position and distance of the obstacle 4 in the forward path 3 of the mobile device 2 when the obstacle 4 is in front of the mobile device 2, farther than the distance D and in the forward path 3 for preventing collisions of the mobile device 2 with the obstacle 4 while the mobile device 2 is moving in the direction of forward motion F; the transverse computational line 23 projected to the obstacle 4 is changed along with distance and external shape of the obstacle 4.

The system function or basic operation of the path detection system 1 of the present invention shown in FIG. 1, FIG. 2 and FIG. 3 can be designed and achieved by electronic techniques available now by people skilled in the art.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A path detection system generating laser patterns by a diffractive optical element (DOE), being disposed on a mobile device moved forward toward the direction of forward motion on a plane and used for detecting at least one obstacle in a forward path of the mobile device comprising:
   a laser light source that is used to project a laser beam;
   a diffractive optical element (DOE) that is disposed in front of the laser light source and used for allowing the laser light source to project a structured light toward the forward path of the mobile device therethrough;
   at least one lens used to capture images of the structured light projected to the forward path of the mobile device at a fixed angle and a height difference H between the lens and the laser light source being predetermined; and
   an image processing unit that makes comparisons and performs computation according to data of the images of the structured light captured by the lens;
   wherein the laser pattern of the structured light generated by the DOE includes only one transverse baseline projected directly onto the plane and at least one separate transverse computational line; the transverse baseline and the computational lines are crossed with a direction of forward motion of the mobile device; the transverse baseline and the computational lines have different angle of projection relative to the direction of forward motion of the mobile device;
   wherein the projected position on the plane of the transverse baseline is closest to the mobile device; a distance D on the plane between the projected position of the transverse baseline relative to the mobile device is predetermined;
   wherein the respective transverse computational line projected to the obstacle is changed along with distance and external shape of the obstacle when the obstacle is in the forward path of the mobile device; thus the image of the respective transverse computational line captured by the lens is also changed; the image processing unit makes comparisons and performs computation according to changes in positions and distances of the image of the respective transverse computational line relative to the X axis and the Y axis of the transverse baseline to check and get relative position and distance of the obstacle in the forward path of the mobile device in a real time manner for avoiding collisions of the mobile device with the obstacle;
   wherein a laser light beam emitted from the laser light source includes visible laser light and invisible laser light; the invisible light includes infrared (IR) laser light;
   wherein the lens included in the path detection system is disposed above or under the laser light source and there is an angle between the lens and the laser light source;
   wherein the transverse baseline and the transverse computational line include straight lines parallel to each other or curved lines parallel to each other; and
   wherein a processor of the path detection system that generates laser patterns by a diffractive optical element (DOE) performs the function of:
   setting the structured light to includes only a transverse baseline projected directly onto the plane and at least one transverse computational line while the transverse baseline and the computational lines being crossed with a direction of forward motion of the mobile device; the transverse baseline and the computational lines having different angle of projection relative to the direction of forward motion of the mobile device;
   setting the projected position on the plane of the transverse baseline most closest to the mobile device and predetermining a distance on the plane between the projected position of the transverse baseline and the mobile device as D; and
   making comparisons and performing computation by the image processing unit according to changes in position and distance of images of the transverse computational line relative to the X axis and the Y axis of the transverse baseline captured by the lens so as to check and get relative position and distance of the obstacle in the forward path of the mobile device when the obstacle is in front of the mobile device, farther than the distance D and in the forward path for preventing collisions of the mobile device with the obstacle while the mobile device is moving in the direction of forward motion; the transverse computational line projected to the obstacle is changed along with distance and external shape of the obstacle.

2. The system as claimed in claim 1, wherein the mobile device includes a robot able to move or a machine that moves automatically; the machine that moves automatically includes a clean robot.

* * * * *